United States Patent [19]

Arena et al.

[11] Patent Number: 4,523,872
[45] Date of Patent: Jun. 18, 1985

[54] TORSION RESISTANT GROOVED JOINT

[75] Inventors: Aldo Arena, Smithtown; Robert L. Benoit, Oakdale, both of N.Y.

[73] Assignee: Grumman Aerospace Corporation, Bethpage, N.Y.

[21] Appl. No.: 292,252

[22] Filed: Aug. 12, 1981

[51] Int. Cl.³ .............................................. F16B 4/00
[52] U.S. Cl. .................................. 403/274; 403/292; 403/300; 403/359; 29/421 M; 29/517
[58] Field of Search ............ 29/517, 515, 516, 421 R, 29/421 E, 421 M; 403/285, 274, 284, 359, 300, 292; 74/667; 464/97

[56] References Cited

U.S. PATENT DOCUMENTS

| | | | |
|---|---|---|---|
| 1,291,388 | 6/1919 | Bright et al. | 29/516 |
| 1,329,479 | 2/1920 | Savon | 403/274 X |
| 1,548,990 | 8/1925 | Garman | 403/285 |
| 1,703,037 | 2/1929 | Heck . | |
| 1,775,055 | 9/1930 | Tarbox . | |
| 2,174,010 | 9/1939 | Patterson | 29/516 |
| 2,429,293 | 10/1947 | Peck et al. | 403/300 X |
| 2,969,996 | 6/1961 | White, Jr. | 403/274 |
| 3,293,884 | 12/1966 | Grob | 464/162 |
| 3,432,192 | 3/1969 | Ito et al. | 29/515 X |
| 3,432,916 | 3/1969 | Fisher et al. . | |
| 3,642,311 | 2/1972 | Edgemond, Jr. . | |
| 3,837,755 | 9/1974 | Benoit et al. | 403/274 |
| 4,125,000 | 11/1978 | Grob | 464/162 |
| 4,154,082 | 5/1979 | Beech | 72/370 |

FOREIGN PATENT DOCUMENTS

| | | | |
|---|---|---|---|
| 23321 | 12/1882 | Fed. Rep. of Germany . | |
| 25227 | 2/1982 | Japan | 29/516 |

Primary Examiner—Richard J. Scanlan, Jr.
Attorney, Agent, or Firm—Morgan, Finnegan, Pine, Foley & Lee

[57] ABSTRACT

A torque tube employing end members interconnected by a tubular member. The end members are provided with a male extension having radially spaced, axially extending grooves, the number of grooves, outer diameter of the end member, groove width and groove length being in prescribed proportions and ratios. The ends of the tubular member are positioned over the male end member extensions and the tube walls are conformed to the end member and grooves electromagnetically so that the tube walls are recessed into the grooves.

6 Claims, 5 Drawing Figures

TORSION RESISTANT GROOVED JOINT

This invention relates to the assembly and attachments of tubular parts to mating members and, more particularly, to the assembly and attachment of metal tubes to end fittings to form torsion members.

It is common practice such, for example, for use in aircraft and aerospace vehicles, to make torque or torsion members by connecting the ends of a tubular member to preformed members formed and adapted to fasten and interconnect the assembled torque or torsion member to the elements between which torque or torsion is to be transmitted. The tubular member transmits the torque or torsion between the preformed end members and allows for a substantial reduction in the overall weight of the assembly. This is, of course, of substantial importance in aircraft and aerospace vehicles.

Various arrangements have, heretofore, been employed in interconnecting the ends of the tubular member to the preformed ends. Thus, the surface of the preformed ends to be mated with the tube have been provided with teeth, serrations or grooves, the tube end has been slipped over the teeth, serrations or grooves and the tube end has been crimped or compressed causing the teeth, serrations or grooves to bite into the inner tube wall. To be effective in such arrangements, the mating surface and inner tube wall must be snugly fit and close production tolerances are required. Furthermore, the teeth, serrations or grooves biting into the inner tube wall and the tool used to crimp or compress the tube onto the end member or stress points or areas on the tube which, during use, can result in fatigue or stress failures. In an aircraft or aerospace vehicle such failures are, of course, undesirable.

In U.S. Pat. No. 3,837,755 there is shown and described a tubular control or pushrod in which a tubular member is connected, at its ends, to fitting members provided with circumferential grooves of specified width, depth and side wall configuration. The tube end is slipped over the grooves and the tube is compressed into the grooves. The control or pushrod of the patent is for axial operation and replaces a rivet attachment. When actuated axially, according to the patent, the grooved arrangement of the patent has an axial failure strength almost three times the axial strength of the conventional riveted control rod.

In the present invention, it has been discovered that the grooving and forming arrangement of the '755 pushrod patent can be adapted to torque or torsion transmitting tubes and a member can be produced wherein the torque or torsion strength of the tube at the end connection exceeds the torsional buckling and failure strength of the tube, itself. It has been discovered that, by extending the grooves axially of the tube and by maintaining the groove side walls at an angle within prescribed limits, the number of grooves to the outer diameter of the end fitting and groove width at a prescribed ratio, the groove depth to the groove width within a prescribed ratio and the axial length of the grooves longer than the circumferential groove width, the advantages of the instant invention can be attained.

The instant invention will be more fully described and will be better understood from the following description taken with the appended drawings in which FIG. 1 is a side view, broken and partly in section, of the torque or torsion tube of the instant invention;

Figure 1:
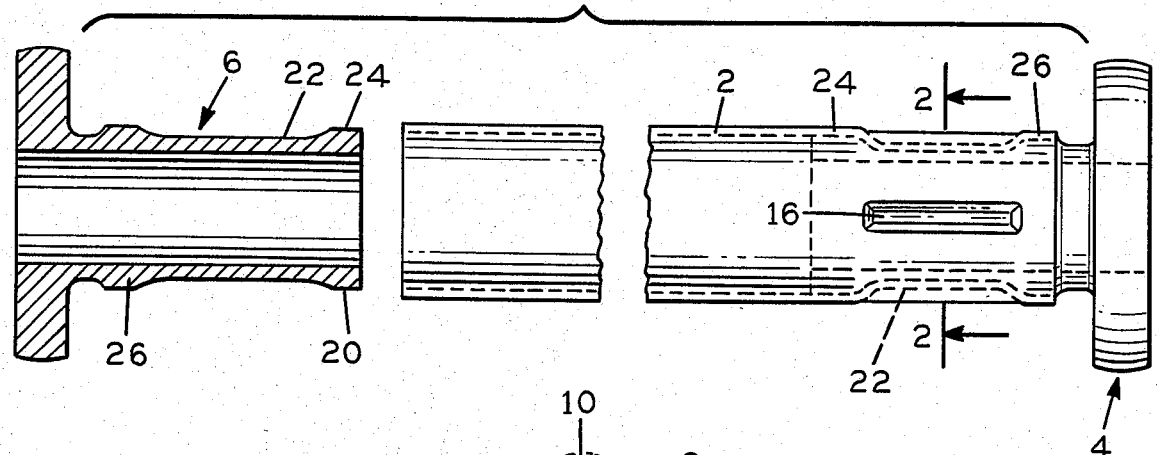

Referring to the drawings, FIG. 1, tube 2 which may be of standard wall thickness, for example aluminum tubes having wall thickness of 0.058 in. and tubes having wall thickness of 0.095 in. have been used, is shown assembled in accordance to the invention to one end member, generally designated 4 and before assembly at its other end to end member, generally designated 6. In the illustrated embodiment, the end members are identical. However, if required by the end use for which the unit is assembled, the end members may be of different configuration.

Figure 2:
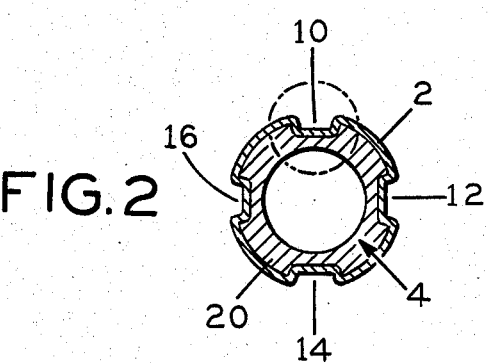
FIG. 2 is a cross sectional view taken at 2—2 FIG. 1.

End members 4, 6 in the illustrated embodiment are each provided with four grooves, equally spaced around the circumference of the end member, for example, grooves 10, 12, 14, 16 in end member 4, FIG. 2, and extending axially therealong. The open end of tube 2 is slipped over the male end 20 of the end member and over axially extending and longitudinally spaced grooves 10, 12, 14, 16 and is compressed thereinto in a manner later described. As best shown in FIG. 1, the male end 20 of the end member is axially grooved, at 22, between shoulders 24, 26. Grooves 10, 12, 14, 16 extend axially between shoulders 24, 26. In assembling the torque tube, the open end of tube 2 is slipped over shoulders 24, 26 and rests thereon when tube 2 is compressed. The depth of the grooves at 22 is selected so that the end of tube 2 can be compressed, as hereinafter described, and thereby recessed and into grooves 10, 12, 14, 16 without appreciable stretching, thinning or weakening of the tube wall and, at the same time, without buckling of such tube wall end.

Figure 3:
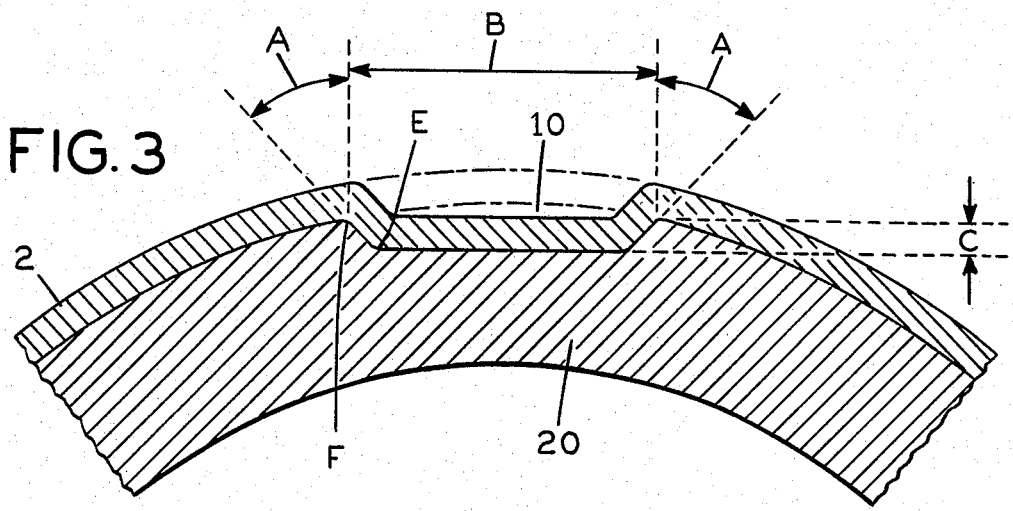
FIG. 3 is an enlarged view of the portion in the circle in FIG. 2.
Figure 3A:
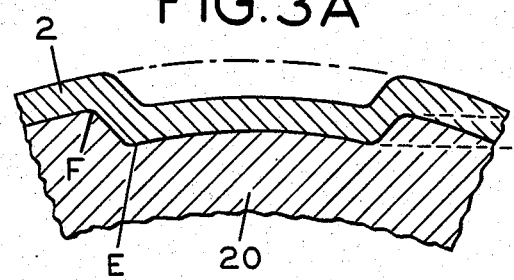
FIGS. 3a and 3b are views similar to FIG. 3 but showing the bottom of the groove curved outwardly and curved inwardly, respectively.
Figure 3B:
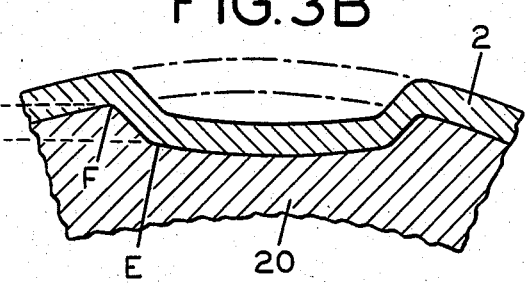

As best shown in FIGS. 2 and 3, after tube 2 is slipped over male end 20 and shoulders 24, 26 thereon, the end of tube 2 over grooves 10, 12, 14, 16, is compressed, forcing the material of tube 2 to conform to the contour of grooves 10, 12, 14, 16 so as to be recessed therein without substantial stretching or thinning of the tube wall thickness. Compressing of the tube end to the contour of grooves 10, 12, 14, 16 can be accomplished by swaging, explosion forming, rubber press forming and electromagnetically. Tool marking of the tube wall should be avoided. Preferably, the tube end is compressed and the contouring of the tube wall to the grooves of the end member is accomplished electromagnetically.

In the practice of the instant invention and with respect to the reference on FIG. 3, groove angle A should be not substantially less than 5° and not substantially more than 60°, groove width should be not substantially less than 0.15 in. and not substantially greater than 0.45 in. and the depth of the groove, as measured vertically at the edge of the groove, C FIG. 3, should not be less than 0.02 in. and not substantially greater than 0.10 in. The edges of the groove at E and F and at the forward and rearward groove ends should have to a radius between about 0.01 to about 0.15 in. A groove side wall and end wall angle of 41.4±0.5°, a groove width of 0.298–0.302 in., a groove depth of 0.034±0.002 in. and a of 0.020 in. 0.03 in. has been demonstrated to be the preferred arrangement for a satisfactory torque or torsion tube for most aircraft and aerospace vehicle use.

In the practice of the invention, the ratio of the number of grooves and outer diameter of the end member or fitting to the groove width, the ratio of groove depth to groove width and groove length to groove width is important. Thus, the number of grooves divided by the outer diameter of the end member or fitting should be equal to or less than 2.1 divided by the groove width; the depth of the groove, as measured at C, FIG. 3, divided by the groove width, measured at B, FIG. 3, should be equal to or less than 2.0; and, the length of the groove should be greater than the groove width.

In addition to high torque strength, the torque or torsion tube of the instant invention, electromagnetically assembled, is assembled at a lower cost than conventional crimping techniques. More consistent high conformity of tube to groove, resulting in superior static and fatigue properties of the joint is attained. Assembly of the tube and tube ends is not subject to operator proficiency. Furthermore, the manufacturing tolerance between the tube inner diameter and the outer diameter of the end fitting or member is less critical, reduces sizing of the tube ends to fit end fitting and further reduces cost.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

We claim:

1. A torque tube assembly wherein the torsional strength of the end connection exceeds the torsional strength of the tube comprising a pair of end members interconnected by a tubular member, each of said end members having a male extension extending into said tubular member, said male members each having a plurality of axial grooves spaced equidistant circumferentially around said male member with shoulders at the opposite axial ends of said grooves, the inner wall of said tubular member resting on said shoulders, end portions of said tubular member intermediate said shoulders being recessed into said grooves and forming a torque transmitting inteconnection therebetween, each of said axial grooves being comprised of a plurality of straight side walls and a bottom member intersecting said side walls, each of said side walls being equally angularly sloped with respect to a vertically disposed plane normal to a horizontally disposed plane passing through intersections of said side walls and an outer surface of said end members, said intersections of said side walls with said outer surface and said bottom member each having a radius, the axial length of said grooves between said shoulders being greater than the circumferential width of said grooves, the number of grooves in the end member divided by the outer diameter of the end member being equal to or less than 2.1 divided by the groove width, the depth of each groove, as measured substantially vertically at the groove edge, divided by the groove width, measured at the bottom of the groove, being equal to or less than 2, and the angular slope of each of the groove side walls being not substantially less than 5° and not substantially more than 60° with said side walls sloping away from said bottom member of the recess, whereby the angle of slope of said groove side walls is selected in accordance with the wall thickness of said tubular member.

2. A torque tube assembly, as recited in claim 1 in which the width of said grooves is not substantially greater than 0.45 in.

3. A torque tube assembly, as recited in claim 1, in which the depth of said grooves measured vertically at the groove edge is not substantially less than 0.02 in. and not substantially greater than 0.10 in.

4. A torque tube assembly, as recited in claim 1 in which said intersections of said side walls with said outer surface and said bottom member have a radius between 0.01 and 0.15 inches.

5. A torque tube assembly, as recited in claim 2, in which the depth of said grooves measured vertically at the groove edge is not substantially less than 0.02 in. and not substantially greater than 0.10 in.

6. A torque tube assembly, as recited in claim 5 in which said intersections of said side walls with said outer surface and said bottom member have a radius between 0.01 and 0.15 inches.

* * * * *